United States Patent
Jiang

(10) Patent No.: US 10,360,491 B2
(45) Date of Patent: Jul. 23, 2019

(54) METHOD FOR PROVIDING RANDOM COMBINATION STATUS CODE FOR COMMODITY

(71) Applicant: Feng Jiang, Chengdu (CN)

(72) Inventor: Feng Jiang, Chengdu (CN)

(73) Assignee: Feng Jiang, Chengdu, Sichuan Province (CN)

( * ) Notice: Subject to any disclaimer, the term of this patent is extended or adjusted under 35 U.S.C. 154(b) by 0 days.

(21) Appl. No.: 16/075,135

(22) PCT Filed: Jan. 22, 2017

(86) PCT No.: PCT/CN2017/072001
§ 371 (c)(1),
(2) Date: Aug. 2, 2018

(87) PCT Pub. No.: WO2017/133502
PCT Pub. Date: Aug. 10, 2017

(65) Prior Publication Data
US 2018/0373971 A1     Dec. 27, 2018

(30) Foreign Application Priority Data

Feb. 5, 2016   (CN) .......................... 2016 1 0081161
Oct. 15, 2016  (CN) .......................... 2016 1 0899981

(51) Int. Cl.
*G06K 19/07*   (2006.01)
*G06K 19/073*  (2006.01)
*G06K 19/077*  (2006.01)

(52) U.S. Cl.
CPC ....... *G06K 19/07309* (2013.01); *G06K 19/07* (2013.01); *G06K 19/07716* (2013.01); *G06K 19/07743* (2013.01)

(58) Field of Classification Search
CPC ................................................. G06K 19/07309
USPC ................................................... 235/492, 493
See application file for complete search history.

(56) References Cited

U.S. PATENT DOCUMENTS

| | | | |
|---|---|---|---|
| 2013/0211870 A1* | 8/2013 | Lawson | G06Q 10/06315 705/7.25 |
| 2013/0238471 A1* | 9/2013 | Maraz | G06Q 10/087 705/28 |
| 2016/0364681 A1* | 12/2016 | Andrus | G06Q 10/087 |
| 2018/0189725 A1* | 7/2018 | Mattingly | B65G 1/02 |

* cited by examiner

*Primary Examiner* — Allyson N Trail
(74) *Attorney, Agent, or Firm* — Li & Cai Intellectual Property Office

(57) ABSTRACT

The present invention provides a method for providing a random combination status code for a commodity, comprising parts A and B provided on a commodity and corresponding circuit components. The parts A and B have particular joint surfaces, and their respective joint surfaces have conductive geometric patterns made of a conductive material; the combination of these patterns reflects the on/off of a circuit, thereby generating potential signals which record and transmit information by means of other circuit components. In this coding method, different storage statuses of a commodity can be distinguished according to status bit information sent by the commodity. The method can be widely used in commodity packaging, and can achieve good effects in managing commodity circulation, quality and safety.

22 Claims, 2 Drawing Sheets

METHOD FOR PROVIDING RANDOM COMBINATION STATUS CODE FOR COMMODITY

TECHNICAL FIELD

The present invention relates to an RFID chip, and specifically belongs to the field of random codes of a commodity under different statuses.

BACKGROUND

When some special products or important commodities leave the factory, it is usually needed to provide a special random code to represent that they are under a special status. When they enter another status, it is hoped the code is not easy to be acquired by the outside world for fear that the products or commodities are wrongly considered as being under the original storage status. For example, in the commodity anti-counterfeiting field, it is preferred to have such a random code scheme that a completely random status code is produced before a commodity is opened for consumption, which is no longer in existence or hard to be restored in the outside world (out of the manufacturer's database) after being consumed. It is very significant in order to prevent high-added-value or high-price commodities from being counterfeited with old packages or used electronic tags.

SUMMARY

The present invention aims to solve a problem of random codes of a commodity under different statuses so as to prevent counterfeit and shoddy products.

To realize the above purpose, the present invention provides the following technical schemes.

Scheme 1:

A method for providing a random combination status code for a commodity includes a status code interface circuit component arranged on the commodity, where the status code interface circuit component at least includes a part A and a part B;

the part A and the part B of the status code interface circuit component are respectively provided with at least one particular joint surface; a plurality of conductive contacts are distributed on the particular joint surface; the conductive contacts constitute a conductive geometric pattern;

the conductive geometric pattern on the particular joint surface of the part A is connected to an external interface circuit that needs to collect a random combination status code; when the particular joint surface of the part A and the particular joint surface of the part B are combined together, the external interface circuit that needs to collect a random combination status code forms a conducting loop through the conductive geometric pattern on the part A and the conductive geometric pattern on the part B, thereby producing a set of status codes;

when the two parts A and B are separated, the external interface circuit that needs to collect a random combination status code produces a set of initial status bit information through the conductive geometric pattern of the part A; when the particular joint surfaces of the two parts A and B are combined together, the conductive geometric patterns on the particular joint surfaces of the two parts A and B are randomly jointed, and the on-off status of the conducting loop formed by the external interface circuit that needs to collect a random combination status code through the conductive geometric pattern of the part A is changed as a result of the influence of the conductive geometric pattern of the part B, thereby producing a set of particular status bit information; when the two parts A and B are again combined after being separated, the conductive geometric patterns on the particular joint surfaces of the two parts A and B are again randomly jointed, and the on-off status of the conducting loop is again changed, thereby producing a new set of status bit information.

Scheme 2:

A method for providing a random combination status code for a commodity includes an RFID chip arranged on the commodity and provided with an interactive switched input port and a status code interface circuit component arranged on the commodity, where the status code interface circuit component at least includes a part A and a part B;

the part A and the part B of the status code interface circuit component are respectively provided with at least one particular joint surface; a plurality of conductive contacts are distributed on the particular joint surface; the conductive contacts constitute a conductive geometric pattern;

the conductive geometric pattern on the particular joint surface of the part A is connected to the interactive switched input port of the RFID chip; when the particular joint surface of the part A and the particular joint surface of the part B are combined together, the interactive switched input port of the RFID chip forms a conducting loop through the conductive geometric pattern of the part A and the conductive geometric pattern of the part B, thereby collecting a set of status codes;

when the two parts A and B are separated, the interactive switched input port of the RFID chip produces a set of initial status bit information through a conductive path formed by the conductive geometric pattern of the part A; when the particular joint surfaces of the two parts A and B are combined together, the conductive geometric patterns on the particular joint surfaces of the two parts A and B are randomly jointed, the conductive geometric pattern of the part B changes the on-off status of the conducting loop formed by the conductive geometric pattern of the part A, so that the interactive switched input port of the RFID chip collects a set of particular status bit information; when the two parts A and B are again jointed after being separated, the conductive geometric patterns on the particular joint surfaces of the two parts A and B are again randomly jointed, and the on-off status of the conducting loop is again changed, thereby producing a new set of status bit information;

the RFID chip provided with the interactive switched input port includes an RF interface circuit unit, a calculation control unit, a storage unit and an input interface circuit unit; the storage unit stores a plurality of information; when an RFID reader-writer and the RFID chip carry out read and write operations, the information produced by the RFID reader-writer and the calculation control unit is transmitted and exchanged by the RF interface circuit unit through an external antenna of the RF interface circuit unit; in the RFID chip, the calculation control unit receives the status bit information produced by the input interface circuit unit;

when an application system of the RFID chip sends a conventional special instruction to the RFID chip through the RFID reader-writer, one or more of the following steps a) to e) are executed:

a) the reader-writer, through the calculation control unit, reads the status bit information produced by the input interface;

b) the information produced by the calculation control unit is influenced by the status bit information produced by the input interface unit, and the information produced by the calculation control unit is acquired by the reader-writer;

c) the calculation control unit, according to the status bit information produced by the input interface unit, selectively sends one or more of the information stored in the storage unit to the outside;

d) the calculation control unit calculates or determines the information to be sent to the outside, according to a calculation control strategy, by using the status bit information produced by the input interface unit and the information stored in the storage unit as parameters; and e) the calculation control unit automatically locks the storage unit, and sends abnormal status change information to the outside, according to a calculation control strategy, by using the status bit information produced by the input interface unit and the information stored in the storage unit as parameters.

Further, the particular joint surfaces constituted by the conductive geometric patterns on the part A and the part B of the status code interface circuit component are non-planar joint surfaces on a planar round, square, elongated, special-shaped or stereoscopic part.

Further, the calculation control unit is a digital logic calculation control unit; the status bit information produced by the input interface circuit unit and received by the calculation control unit is stored in the storage unit or a server; the storage unit is an electrically erasable programmable read-only memory (EEPROM).

Further, the calculation control unit is a microprocessor calculation control unit; the microprocessor calculation control unit is composed of a microprocessor (CPU) and a program memory (ROM); the storage unit is composed of a random memory (RAM) and an electrically erasable programmable read-only memory (EEPROM).

Further, the two parts A and B may exchange their function and position on the commodity.

It is worth noting that, the part A referred to in the claims and specification of the present invention may be located on the outer surface of a commodity package; the part B may be a combination wafer that is combined with the part A; when the part B and the part A are combined for the first time, the produced status bit information is called an initial status bit; the initial status bit is sent to the application system; if the part B is separated from the initial combination and coverage status, no matter whether the two parts A and B are again randomly jointed, the probability that the system reads from the status code interface circuit a status bit matching with the initial status bit is a small probability event relative to application demands.

Further, the two parts A and B may exchange their function and position on the commodity.

The present invention has undoubted technical efficiency. Real products can be distinguished from fake ones through the change of the status bit information, and may not be substituted by fake and shoddy ones, which is of great importance for maintaining legality and value. The schemes of the present invention are highly stable, highly reliable, and very easy to be implemented; they can be widely applied to the anti-counterfeiting field.

DETAILED DESCRIPTION OF THE EMBODIMENTS

Figure 1:
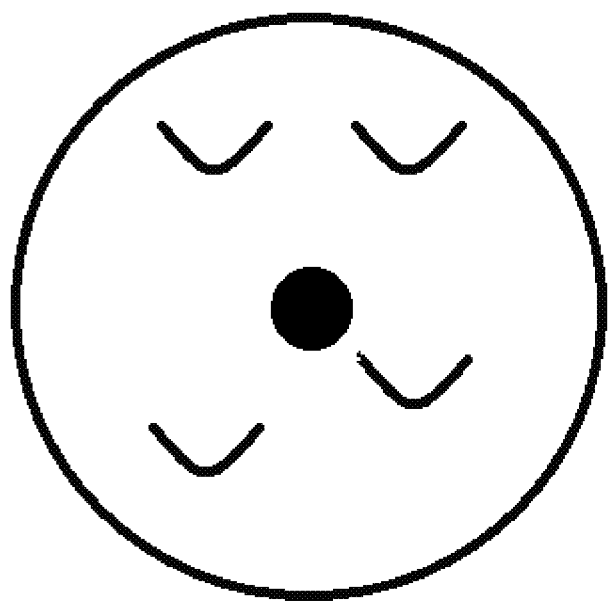
FIG. 1 is a schematic diagram of a conductive geometric pattern on a particular joint surface of a part A.

The present invention will be further described based on the following embodiments. Nevertheless, it should not be understood that the above subject scope of the present invention is merely restricted within the embodiments. The protection scope of the present invention should include various substitutions and modifications that are made according to the common technical knowledge and conventional means of the art without departing from the above technical concept of the present invention.

Embodiment 1:

A method for providing a random combination status code for a commodity includes a status code interface circuit component arranged on the commodity, where the status code interface circuit component is composed of a part A and a part B.

The part A and the part B of the status code interface circuit component include a particular joint surface constituted by a conductive geometric pattern. The conductive geometric pattern on the particular joint surface of the part A is respectively connected to an external interface circuit that needs to collect a random combination status code. When the particular joint surface of the part A and the particular joint surface of the part B are combined together, the external interface circuit that needs to collect a random combination status code forms a conducting loop through the conductive geometric pattern on the part A and the conductive geometric pattern on the part B, thereby producing a set of status codes (i.e. the geometric patterns on the joint surfaces of the two parts A and B are actually conductive lines, which are connected and disconnected to output signals).

When the two parts A and B are separated, the external interface circuit that needs to collect a random combination status code produces a set of initial status bit information through the conductive geometric pattern of the part A. When the particular joint surfaces of the two parts A and B are combined together, the conductive geometric patterns on the particular joint surfaces of the two parts A and B are randomly jointed, and the on-off status of the conducting loop formed by the external interface circuit that needs to collect a random combination status code through the conductive geometric pattern of the part A is changed as a result of the influence of the conductive geometric pattern of the part B, thereby producing a set of particular status bit information. When the two parts A and B are again combined after being separated, the patterns on the particular joint surfaces of the two parts A and B are again randomly jointed, and the on-off status of the conducting loop is again changed, thereby producing a new set of status bit information.

Specifically, the coding method may be used to distinguish real products from fake ones. That is to say, when the commodity is packaged, the parts A and B are combined well, with their status bit information generated; the status bit information is only changed when the commodity is used after being sold (the parts A and B are separated during the process of use). If an unauthorized person recycles the used package to produce a new commodity, the commodity may be determined as a fake one according to the status bit information that is recorded.

Embodiment 2:

Similar to Embodiment 1, this embodiment discloses a method for providing a random combination status code for a commodity, which includes a status code interface circuit component arranged on the commodity, where the status code interface circuit component is composed of a part A and a part B.

The part A and the part B of the status code interface circuit component include a particular joint surface constituted by a conductive geometric pattern. The conductive geometric pattern on the particular joint surface of the part A is respectively connected to an external interface circuit that needs to collect a random combination status code. When the particular joint surface of the part A and the particular joint surface of the part B are combined together, the external interface circuit that needs to collect a random combination status code forms a conducting loop through the conductive geometric pattern on the part A and the conductive geometric pattern on the part B, thereby producing a set of status codes (i.e. the geometric patterns on the joint surfaces of the two parts A and B are actually conductive lines, which are connected and disconnected to output signals).

When the two parts A and B are separated, the external interface circuit that needs to collect a random combination status code produces a set of initial status bit information through the conductive geometric pattern of the part A. When the particular joint surfaces of the two parts A and B are combined together, the conductive geometric patterns on the particular joint surfaces of the two parts A and B are randomly jointed, and the on-off status of the conducting loop formed by the external interface circuit that needs to collect a random combination status code through the conductive geometric pattern of the part A is changed as a result of the influence of the conductive geometric pattern of the part B, thereby producing a set of particular status bit information. When the two parts A and B are again combined after being separated, the conductive geometric patterns on the particular joint surfaces of the two parts A and B are again randomly jointed, and the on-off status of the conducting loop is again changed, thereby producing a new set of status bit information.

Specifically, the coding method may be used to distinguish real products from fake ones. That is to say, when the commodity is packaged, the parts A and B are combined well, with their status bit information generated; the status bit information is only changed when the commodity is used after being sold (the parts A and B are separated during the process of use). If an unauthorized person recycles the used package to produce a new commodity, the commodity may be determined as a fake one according to the status bit information that is recorded.

Embodiment 3:

A method for providing a random combination status code for a commodity includes an RFID chip arranged on the commodity and provided with an interactive switched input port and a status code interface circuit component arranged on the commodity.

The status code interface circuit component includes two parts, namely A and B. The part A and the part B include a particular joint surface constituted by a conductive geometric pattern. The conductive geometric pattern on the particular joint surface of the part A is connected to the interactive switched input port of the RFID chip. When the particular joint surface of the part A and the particular joint surface of the part B are combined together, the interactive switched input port of the RFID chip forms a conducting loop through the conductive geometric pattern of the part A and the conductive geometric pattern of the part B, thereby collecting a set of status codes.

When the two parts A and B are separated, the interactive switched input port of the RFID chip produces a set of initial status bit information through a conductive path formed by the conductive geometric pattern of the part A. When the particular joint surfaces of the two parts A and B are combined together, the conductive geometric patterns on the particular joint surfaces of the two parts A and B are randomly jointed, the conductive geometric pattern of the part B changes the on-off status of the conducting loop formed by the conductive geometric pattern of the part A, so that the interactive switched input port of the RFID chip collects a set of particular status bit information. When the two parts A and B are again combined after being separated, the patterns on the particular joint surfaces of the two parts A and B are again randomly jointed, and the on-off status of the conducting loop is again changed, thereby producing a new set of status bit information.

The RFID chip provided with the interactive switched input port includes an RF interface circuit unit, a calculation control unit, a storage unit and an input interface circuit unit. The storage unit stores a plurality of information. When an RFID reader-writer and the RFID chip carry out read and write operations, the information produced by the RFID reader-writer and the calculation control unit is transmitted and exchanged by the RF interface circuit unit through an external antenna of the RF interface circuit unit. In the RFID chip, the calculation control unit receives the status bit information produced by the input interface circuit unit.

When an application system of the RFID chip sends a conventional special instruction to the RFID chip through the RFID reader-writer, one or more of the following steps a) to e) are executed:

a) the reader-writer, through the calculation control unit, reads the status bit information produced by the input interface;

b) the information produced by the calculation control unit is influenced by the status bit information produced by the input interface unit, and the information produced by the calculation control unit is acquired by the reader-writer;

c) the calculation control unit, according to the status bit information produced by the input interface unit, selectively sends one or more of the information stored in the storage unit to the outside;

d) the calculation control unit calculates or determines the information to be sent to the outside, according to a calculation control strategy, by using the status bit information produced by the input interface unit and the information stored in the storage unit as parameters; and e) the calculation control unit automatically locks the storage unit, and sends abnormal status change information to the outside, according to a calculation control strategy, by using the status bit information produced by the input interface unit and the information stored in the storage unit as parameters.

Embodiment 4:

A method for providing a random combination status code for a commodity includes an RFID chip arranged on the commodity and provided with an interactive switched input port and a status code interface circuit component arranged on the commodity.

The status code interface circuit component includes two parts, namely A and B. The part A and the part B include a particular joint surface constituted by a conductive geometric pattern. The conductive geometric pattern on the particular joint surface of the part A is connected to the interactive switched input port of the RFID chip. When the particular joint surface of the part A and the particular joint surface of the part B are combined together, the interactive switched input port of the RFID chip forms a conducting loop through the conductive geometric pattern of the part A and the conductive geometric pattern of the part B, thereby collecting a set of status codes.

When the two parts A and B are separated, the interactive switched input port of the RFID chip produces a set of initial status bit information through a conductive path formed by the conductive geometric pattern of the part A. When the particular joint surfaces of the two parts A and B are combined together, the conductive geometric patterns on the particular joint surfaces of the two parts A and B are randomly jointed, the conductive geometric pattern of the part B changes the on-off status of the conducting loop formed by the conductive geometric pattern of the part A, so that the interactive switched input port of the RFID chip collects a set of particular status bit information. When the two parts A and B are again combined after being separated, the conductive geometric patterns on the particular joint surfaces of the two parts A and B are again randomly jointed, and the on-off status of the conducting loop is again changed, thereby producing a new set of status bit information.

The RFID chip provided with the interactive switched input port includes an RF interface circuit unit, a calculation control unit, a storage unit and an input interface circuit unit. The storage unit stores a plurality of information. When an RFID reader-writer and the RFID chip carry out read and write operations, the information produced by the RFID reader-writer and the calculation control unit is transmitted and exchanged by the RF interface circuit unit through an external antenna of the RF interface circuit unit. In the RFID chip, the calculation control unit receives the status bit information produced by the input interface circuit unit.

When an application system of the RFID chip sends a conventional special instruction to the RFID chip through the RFID reader-writer, one or more of the following steps a) to e) are executed:

a) the reader-writer, through the calculation control unit, reads the status bit information produced by the input interface;

b) the information produced by the calculation control unit is influenced by the status bit information produced by the input interface unit, and the information produced by the calculation control unit is acquired by the reader-writer;

c) the calculation control unit, according to the status bit information produced by the input interface unit, selectively sends one or more of the information stored in the storage unit to the outside;

d) the calculation control unit calculates or determines the information to be sent to the outside, according to a calculation control strategy, by using the status bit information produced by the input interface unit and the information stored in the storage unit as parameters; and e) the calculation control unit automatically locks the storage unit, and sends abnormal status change information to the outside, according to a calculation control strategy, by using the status bit information produced by the input interface unit and the information stored in the storage unit as parameters.

Embodiment 5:

The major part of this embodiment is the same as Embodiment 1 or Embodiment 2. Further, the particular joint surfaces of the two parts A and B are provided with a plurality of conductive contacts; the conductive contacts are a geometric pattern made of a conductive material.

Figure 2:
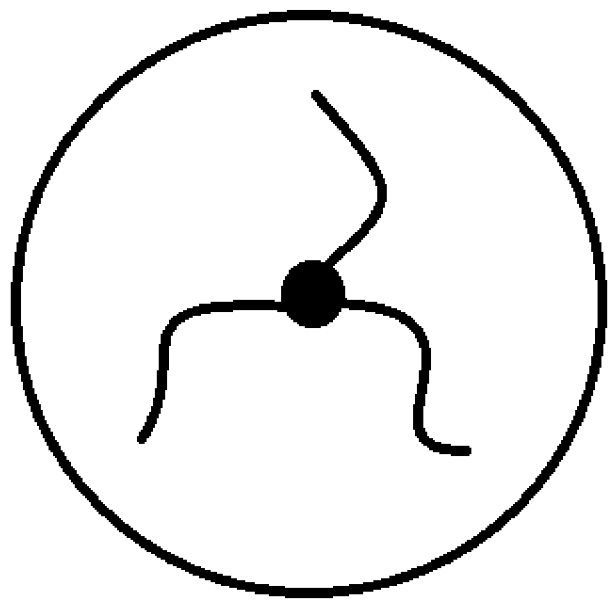
FIG. 2 is a schematic diagram of a conductive geometric pattern on a particular joint surface of a part B.

Refer to FIG. 1, the conductive geometric pattern on the part A is constituted by four metal contacts (i.e. conductive contacts) that are randomly distributed on the particular joint surface. Refer to FIG. 2, the conductive geometric pattern on the part B is constituted by three metal branches that radiate from an earth point on the particular joint surface. The three metal branches are all reliably earthed.

Figure 3:
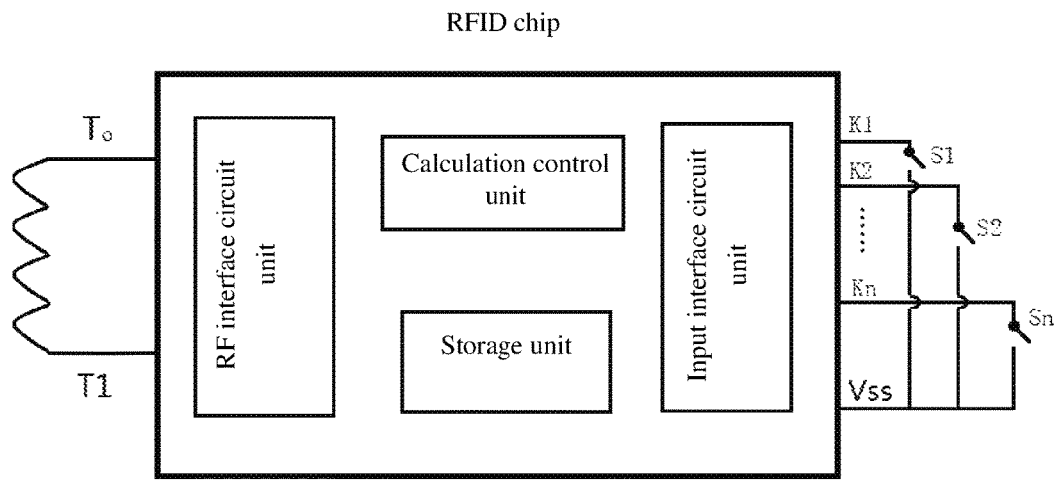
FIG. 3 is a functional schematic diagram of an RFID chip with an interactive switched input port.
Figure 4:
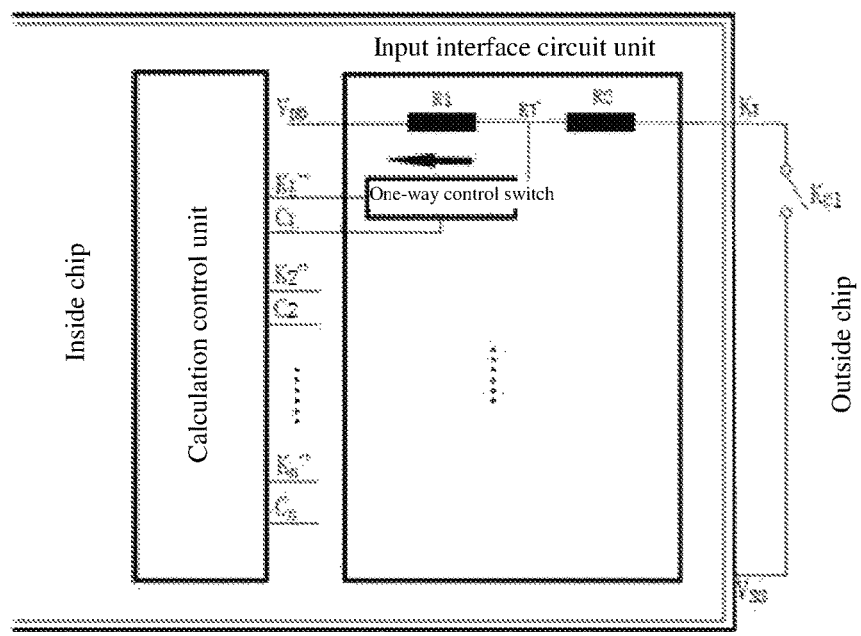
FIG. 4 is a schematic diagram of connection of an input interface circuit.

Refer to FIG. 3, the four metal contacts (conductive contacts) on the part A are respectively connected to terminals K1, K2, K3 and K4 of K1, K2, . . . Kn; the conductive geometric pattern on the part B is connected to Vss; when the part A and the part B are separated, switches S1, S2, S3 and S4 are disconnected; when the particular joint surfaces of the part A and the part B are combined, the switches S1, S2, S3 and S4 are randomly connected to produce random status bit information (0000, 0011, 0001, 0111, 0100, . . . ).

What is claimed is:

1. A method for providing a random combination status code for a commodity, characterized by comprising a status code interface circuit component arranged on the commodity, wherein the status code interface circuit component is composed of a part A and a part B;

the part A and the part B of the status code interface circuit component comprise a particular joint surface constituted by a conductive geometric pattern; the conductive geometric pattern on the particular joint surface of the part A is connected to an external interface circuit that needs to collect a random combination status code; when the particular joint surface of the part A and the particular joint surface of the part B are combined together, the external interface circuit that needs to collect a random combination status code forms a conducting loop through the conductive geometric pattern on the part A and the conductive geometric pattern on the part B, thereby producing a set of status codes; when the two parts A and B are separated, the external interface circuit that needs to collect a random combination status code produces a set of initial status bit information through the conductive geometric pattern of the part A; when the particular joint surfaces of the two parts A and B are combined together, the conductive geometric patterns on the particular joint surfaces of the two parts A and B are randomly jointed, and an on-off status of the conducting loop formed by the external interface circuit that needs to collect a random combination status code through the conductive geometric pattern of the part A is changed as a result of the influence of the conductive geometric pattern of the part B, thereby producing a set of particular status bit information; when the two parts A and B are again combined after being separated, the geometric patterns on the particular joint surfaces of the two parts A and B are again randomly jointed, and an on-off status of the conducting loop is again changed, thereby producing a new set of status bit information.

2. The method for providing the random combination status code for the commodity according to claim 1, characterized in that the plurality of conductive contacts that constitute the conductive geometric pattern on the particular joint surface of the part A are respectively connected to input terminals of the external interface circuit; the input terminals are not earthed permanently;

the conductive geometric pattern that constitutes the particular joint surface of the part B is completely or partially earthed when the particular joint surfaces of the parts A and B are combined;

when the particular joint surfaces of the part A and the part B are combined, the connection relation between the input terminals and an earth point is randomly selected, thereby producing random status bit information.

3. The method for providing the random combination status code for the commodity according to claim 1, characterized in that the plurality of conductive contacts that constitute the conductive geometric pattern on the particular joint surface of the part A are respectively connected to input terminals of the external interface circuit;

when the part A and the part B are separated, the input terminals and the conductive geometric pattern on the part B have different potentials;

when the particular joint surfaces of the part A and the part B are combined, the connection relation between the input terminals and the conductive geometric pattern on the part B is randomly selected, thereby producing random status bit information.

4. The method for providing the random combination status code for the commodity according to claim 1, characterized in that the function and/or position of the two parts A and B may be exchanged.

5. A method for providing a random combination status code for a commodity, characterized by comprising a status code interface circuit component arranged on the commodity, wherein the status code interface circuit component at least comprises a part A and a part B;

the part A and the part B of the status code interface circuit component are respectively provided with at least one particular joint surface; a plurality of conductive contacts are distributed on the particular joint surface; the conductive contacts constitute a conductive geometric pattern;

the conductive geometric pattern on the particular joint surface of the part A is connected to an external interface circuit that needs to collect a random combination status code; when the particular joint surface of the part A and the particular joint surface of the part B are combined together, the external interface circuit that needs to collect a random combination status code forms a conducting loop through the conductive geometric pattern on the part A and the conductive geometric pattern on the part B, thereby producing a set of status codes;

when the two parts A and B are separated, the external interface circuit that needs to collect a random combination status code produces a set of initial status bit information through the conductive geometric pattern of the part A; when the particular joint surfaces of the two parts A and B are combined together, the conductive geometric patterns on the particular joint surfaces of the two parts A and B are randomly jointed, and an on-off status of the conducting loop formed by the external interface circuit that needs to collect a random combination status code through the conductive geometric pattern of the part A is changed as a result of the influence of the conductive geometric pattern of the part B, thereby producing a set of particular status bit information; when the two parts A and B are again combined after being separated, the conductive geometric patterns on the particular joint surfaces of the two parts A and B are again randomly jointed, and an on-off status of the conducting loop is again changed, thereby producing a new set of status bit information.

6. The method for providing the random combination status code for the commodity according to claim 5, characterized in that the particular joint surfaces constituted by the conductive geometric patterns on the part A and the part B of the status code interface circuit component are non-planar joint surfaces on a planar round, square, elongated, special-shaped or stereoscopic part.

7. The method for providing the random combination status code for the commodity according to claim 5, characterized in that the plurality of conductive contacts that constitute the conductive geometric pattern on the particular joint surface of the part A are respectively connected to input terminals of the external interface circuit; the input terminals are not earthed permanently;

the conductive geometric pattern that constitutes the particular joint surface of the part B is completely or partially earthed when the particular joint surfaces of the parts A and B are combined;

when the particular joint surfaces of the part A and the part B are combined, the connection relation between the input terminals and an earth point is randomly selected, thereby producing random status bit information.

8. The method for providing the random combination status code for the commodity according to claim 5, characterized in that the plurality of conductive contacts that constitute the conductive geometric pattern on the particular joint surface of the part A are respectively connected to input terminals of the external interface circuit;

when the part A and the part B are separated, the input terminals and the conductive geometric pattern on the part B have different potentials;

when the particular joint surfaces of the part A and the part B are combined, the connection relation between the input terminals and the conductive geometric pattern on the part B is randomly selected, thereby producing random status bit information.

9. The method for providing the random combination status code for the commodity according to claim 5, characterized in that the function and/or position of the two parts A and B may be exchanged.

10. A method for providing a random combination status code for a commodity, characterized by comprising an RFID chip arranged on the commodity and provided with an interactive switched input port and a status code interface circuit component arranged on the commodity, wherein the status code interface circuit component comprises two parts, namely A and B; the part A and the part B comprise a particular joint surface constituted by a conductive geometric pattern; the conductive geometric pattern on the particular joint surface of the part A is connected to the interactive switched input port of the RFID chip; when the particular joint surface of the part A and the particular joint surface of the part B are combined together, the interactive switched input port of the RFID chip forms a conducting loop through the conductive geometric pattern of the part A and the conductive geometric pattern of the part B, thereby collecting a set of status codes;

when the two parts A and B are separated, the interactive switched input port of the RFID chip produces a set of initial status bit information through a conductive path formed by the conductive geometric pattern of the part A; when the particular joint surfaces of the two parts A and B are combined together, the conductive geometric patterns on the particular joint surfaces of the two parts A and B are randomly jointed, the conductive geometric pattern of the part B changes an on-off status of the conducting loop formed by the conductive geometric pattern of the part A, so that the interactive switched input port of the RFID chip collects a set of particular status bit information; when the two parts A and B are again jointed after being separated, the patterns on the particular joint surfaces of the two parts A and B are again randomly jointed, and an on-off status of the conducting loop is again changed, thereby producing a new set of status bit information;

the RFID chip provided with the interactive switched input port comprises an RF interface circuit unit, a calculation control unit, a storage unit and an input interface circuit unit; the storage unit stores a plurality of information; when an RFID reader-writer and the RFID chip carry out read and write operations, the information produced by the RFID reader-writer and the calculation control unit is transmitted and exchanged by the RF interface circuit unit through an external antenna of the RF interface circuit unit; in the RFID chip, the calculation control unit receives the status bit information produced by the input interface circuit unit;

when an application system of the RFID chip sends a conventional special instruction to the RFID chip through the RFID reader-writer, one or more of the following steps a) to e) are executed:

a) reading, by the reader-writer, through the calculation control unit, the status bit information produced by the input interface;

b) influencing, by the status bit information produced by the input interface unit, the information produced by the calculation control unit, and acquiring, by the reader-writer, the information produced by the calculation control unit;

c) selectively sending, by the calculation control unit, one or more of the information stored in the storage unit to the outside, according to the status bit information produced by the input interface unit;

d) calculating or determining, by the calculation control unit, the information to be sent to the outside, according to a calculation control strategy, by using the status bit information produced by the input interface unit and the information stored in the storage unit as parameters; and e) automatically locking, by the calculation control unit, the storage unit, and sending abnormal status change information to the outside, according to a calculation control strategy, by using the status bit information produced by the input interface unit and the information stored in the storage unit as parameters.

11. The method for providing the random combination status code for the commodity according to claim 10, characterized in that the calculation control unit is a digital logic calculation control unit; the status bit information produced by the input interface circuit unit and received by the calculation control unit is stored in the storage unit or a server; the storage unit is an electrically erasable programmable read-only memory (EEPROM).

12. The method for providing the random combination status code for the commodity according to claim 10, characterized in that the calculation control unit is a microprocessor calculation control unit; the microprocessor calculation control unit is composed of a microprocessor (CPU) and a program memory (ROM); the storage unit is composed of a random memory (RAM) and an electrically erasable programmable read-only memory (EEPROM).

13. The method for providing the random combination status code for the commodity according to claim 10, characterized in that the plurality of conductive contacts that constitute the conductive geometric pattern on the particular joint surface of the part A are respectively connected to input terminals of the external interface circuit; the input terminals are not earthed permanently;

the conductive geometric pattern that constitutes the particular joint surface of the part B is completely or partially earthed when the particular joint surfaces of the parts A and B are combined;

when the particular joint surfaces of the part A and the part B are combined, the connection relation between the input terminals and an earth point is randomly selected, thereby producing random status bit information.

14. The method for providing the random combination status code for the commodity according to claim 10, characterized in that the plurality of conductive contacts that constitute the conductive geometric pattern on the particular joint surface of the part A are respectively connected to input terminals of the external interface circuit;

when the part A and the part B are separated, the input terminals and the conductive geometric pattern on the part B have different potentials;

when the particular joint surfaces of the part A and the part B are combined, the connection relation between the input terminals and the conductive geometric pattern on the part B is randomly selected, thereby producing random status bit information.

15. The method for providing the random combination status code for the commodity according to claim 10, characterized in that the function and/or position of the two parts A and B may be exchanged.

16. A method for providing a random combination status code for a commodity, characterized by comprising an RFID chip arranged on the commodity and provided with an interactive switched input port and a status code interface circuit component arranged on the commodity, wherein the status code interface circuit component at least comprises a part A and a part B;

the part A and the part B of the status code interface circuit component are respectively provided with at least one particular joint surface; a plurality of conductive contacts are distributed on the particular joint surface; the conductive contacts constitute a conductive geometric pattern;

the conductive geometric pattern on the particular joint surface of the part A is connected to the interactive switched input port of the RFID chip; when the particular joint surface of the part A and the particular joint surface of the part B are combined together, the interactive switched input port of the RFID chip forms a conducting loop through the conductive geometric pattern of the part A and the conductive geometric pattern of the part B, thereby collecting a set of status codes;

when the two parts A and B are separated, the interactive switched input port of the RFID chip produces a set of initial status bit information through a conductive path formed by the conductive geometric pattern of the part A; when the particular joint surfaces of the two parts A and B are combined together, the conductive geometric patterns on the particular joint surfaces of the two parts A and B are randomly jointed, the conductive geometric pattern of the part B changes an on-off status of the conducting loop formed by the conductive geometric pattern of the part A, so that the interactive switched input port of the RFID chip collects a set of particular status bit information; when the two parts A and B are again jointed after being separated, the conductive geometric patterns on the particular joint surfaces of the two parts A and B are again randomly jointed, and an on-off status of the conducting loop is again changed, thereby producing a new set of status bit information;

the RFID chip provided with the interactive switched input port comprises an RF interface circuit unit, a calculation control unit, a storage unit and an input interface circuit unit; the storage unit stores a plurality of information; when an RFID reader-writer and the RFID chip carry out read and write operations, the information produced by the RFID reader-writer and the calculation control unit is transmitted and exchanged by the RF interface circuit unit through an external antenna of the RF interface circuit unit; in the RFID chip, the calculation control unit receives the status bit information produced by the input interface circuit unit;

when an application system of the RFID chip sends a conventional special instruction to the RFID chip through the RFID reader-writer, one or more of the following steps a) to e) are executed:

a) reading, by the reader-writer, through the calculation control unit, the status bit information produced by the input interface;

b) influencing, by the status bit information produced by the input interface unit, the information produced by the calculation control unit, and acquiring, by the reader-writer, the information produced by the calculation control unit;

c) selectively sending, by the calculation control unit, one or more of the information stored in the storage unit to the outside, according to the status bit information produced by the input interface unit;

d) calculating or determining, by the calculation control unit, the information to be sent to the outside, according to a calculation control strategy, by using the status bit information produced by the input interface unit and the information stored in the storage unit as parameters; and e) automatically locking, by the calculation control unit, the storage unit, and sending abnormal status change information to the outside, according to a calculation control strategy, by using the status bit information produced by the input interface unit and the information stored in the storage unit as parameters.

17. The method for providing the random combination status code for the commodity according to claim 16, characterized in that the plurality of conductive contacts that constitute the conductive geometric pattern on the particular joint surface of the part A are respectively connected to input terminals of the external interface circuit; the input terminals are not earthed permanently;

the conductive geometric pattern that constitutes the particular joint surface of the part B is completely or partially earthed when the particular joint surfaces of the parts A and B are combined;

when the particular joint surfaces of the part A and the part B are combined, the connection relation between the input terminals and an earth point is randomly selected, thereby producing random status bit information.

18. The method for providing the random combination status code for the commodity according to claim 16, characterized in that the plurality of conductive contacts that constitute the conductive geometric pattern on the particular joint surface of the part A are respectively connected to input terminals of the external interface circuit;

when the part A and the part B are separated, the input terminals and the conductive geometric pattern on the part B have different potentials;

when the particular joint surfaces of the part A and the part B are combined, the connection relation between the input terminals and the conductive geometric pattern on the part B is randomly selected, thereby producing random status bit information.

19. The method for providing the random combination status code for the commodity according to claim 16, characterized in that the particular joint surfaces constituted by the conductive geometric patterns on the part A and the part B of the status code interface circuit component are non-planar joint surfaces on a planar round, square, elongated, special-shaped or stereoscopic part.

20. The method for providing the random combination status code for the commodity according to claim 16, characterized in that the calculation control unit is a digital logic calculation control unit; the status bit information produced by the input interface circuit unit and received by the calculation control unit is stored in the storage unit or a server; the storage unit is an electrically erasable programmable read-only memory (EEPROM).

21. The method for providing the random combination status code for the commodity according to claim 16, characterized in that the calculation control unit is a microprocessor calculation control unit; the microprocessor calculation control unit is composed of a microprocessor (CPU) and a program memory (ROM); the storage unit is composed of a random memory (RAM) and an electrically erasable programmable read-only memory (EEPROM).

22. The method for providing the random combination status code for the commodity according to claim 16, characterized in that the function and/or position of the two parts A and B may be exchanged.

* * * * *